(12) United States Patent
Khisamutdinov et al.

(10) Patent No.: US 8,311,744 B2
(45) Date of Patent: Nov. 13, 2012

(54) USE OF CHEMICALLY AND GEOLOGICALLY CONSISTENT CONSTRAINTS FOR OBTAINING ELEMENTAL CHEMISTRY DOWNHOLE

(75) Inventors: Alfred Khisamutdinov, Novosibirsk (RU); Mikhail Fedorin, Novosibirsk (RU); Richard Pemper, Sugar Land, TX (US); Xiaogang Han, Tomball, TX (US); Gary A. Feuerbacher, Humble, TX (US); David Jacobi, Woodlands, TX (US); Brian J. LeCompte, Tomball, TX (US); Freddy E. Mendez, Kingwood, TX (US); John M. Longo, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 257 days.

(21) Appl. No.: 12/764,422

(22) Filed: Apr. 21, 2010

(65) Prior Publication Data
US 2010/0312479 A1  Dec. 9, 2010

Related U.S. Application Data

(60) Provisional application No. 61/171,583, filed on Apr. 22, 2009.

(51) Int. Cl.
*G06F 19/00* (2011.01)
*G01V 5/00* (2006.01)
(52) U.S. Cl. .......................................... 702/8; 250/254
(58) Field of Classification Search .................. 702/2, 6, 702/8; 250/254, 262, 269.6
See application file for complete search history.

(56) References Cited

U.S. PATENT DOCUMENTS

| 4,008,392 | A | 2/1977 | Lock et al. |
| 5,440,118 | A | 8/1995 | Roscoe |
| 7,205,535 | B2 | 4/2007 | Madigan et al. |
| 2007/0246649 | A1 | 10/2007 | Jacobi et al. |
| 2009/0114806 | A1* | 5/2009 | Kirkwood et al. ......... 250/269.6 |

OTHER PUBLICATIONS

R.B. Culver et al., "Carbon/Oxygen (C/O) Logging Instrumentation"; Society of Petroleum Engineers, Paper No. 4640; Sep. 30, 1973.
R.C. Hertzog, "Laboratory and Field Evaluation of an Inelastic Neutron Scattering and Capture Gamma Ray Spectrometry Tool"; Society of Petroleum Engineers, Paper No. 7430. Oct. 1, 1978.
Medhat Mickael et al., "Dynamic Multi-parameter Interpretation of Dual-Detector Carbon/Oxygen Measurements"; Society of Petroleum Engineers, SPE Paper No. 56649, Oct. 3, 1999.

(Continued)

*Primary Examiner* — Bryan Bui
(74) *Attorney, Agent, or Firm* — Cantor Colburn LLP

(57) ABSTRACT

A method for estimating a lithotype of an earth formation, the method includes: obtaining at least two different energy spectra of radiation received from the earth formation using the logging tool, each energy spectrum having at least one of a natural gamma-ray spectrum, a fast neutron-induced inelastic spectrum, and a thermal neutron induced capture spectrum; establishing at least one geochemically-based constraint related to elemental spectral yields to be determined; determining the elemental spectral yields from the at least two different energy spectra by decomposing the at least two different energy spectra over weighted sum of monoelemental standards wherein at least one weight is constrained by the at least one geochemically-based constraint and each weight represents a proportion of one monoelemental standard; converting the elemental spectral yields to elemental concentrations; and using a classifier to receive the elemental concentrations as input and to provide a lithotype as output.

20 Claims, 6 Drawing Sheets

OTHER PUBLICATIONS

R. Pemper et al., "A New Pulsed Neutron Sonde for Derivation of Formation Lithology and Mineralogy"; Society of Petroleum Engineers, SPE Paper No. 102770, Sep. 24, 2006.

Notification of Transmittal of the International Search Report and the Written Opinion of the International Searching Authority, or the Declaration; PCT/US2010/032015; Dec. 17, 2010.

* cited by examiner

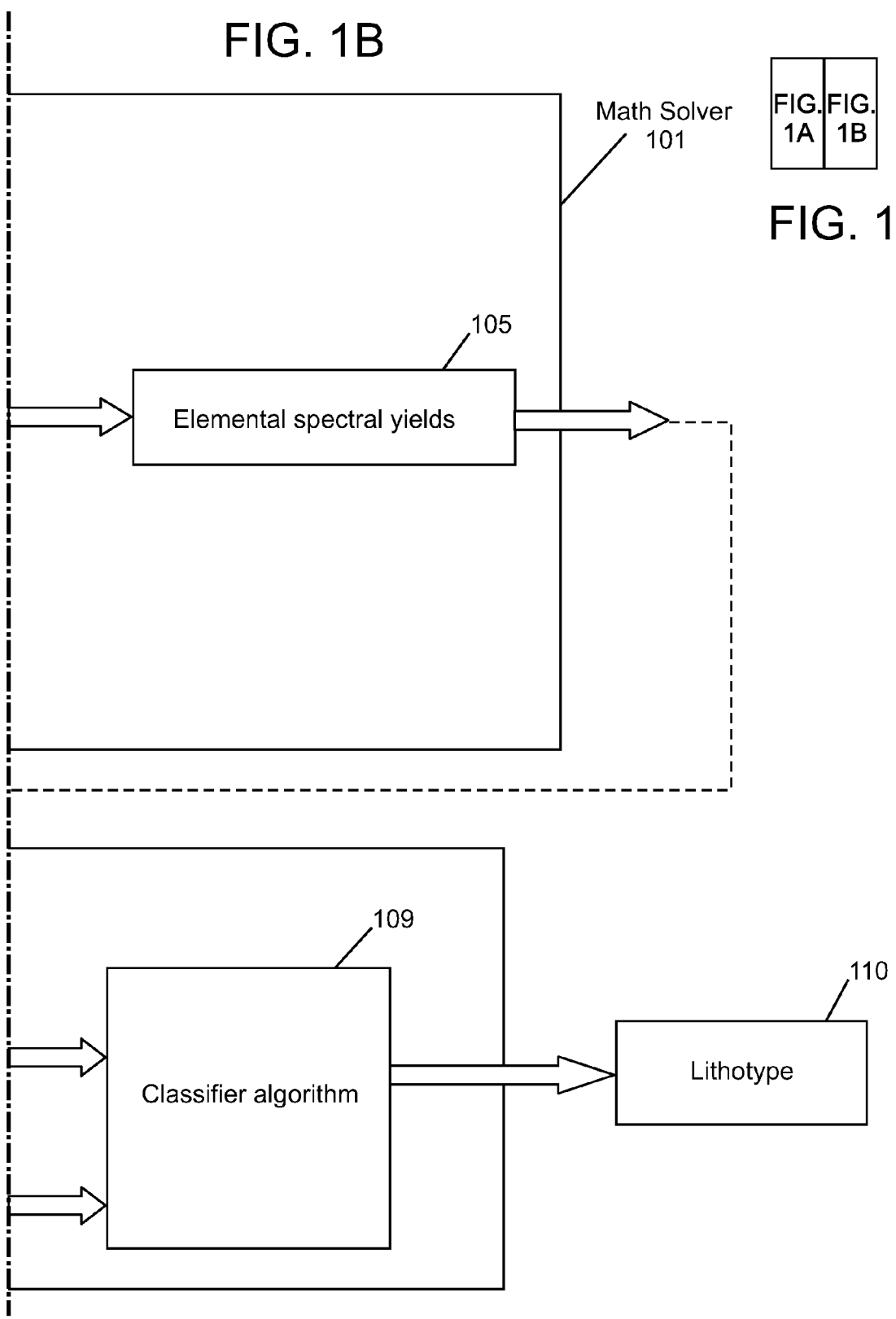

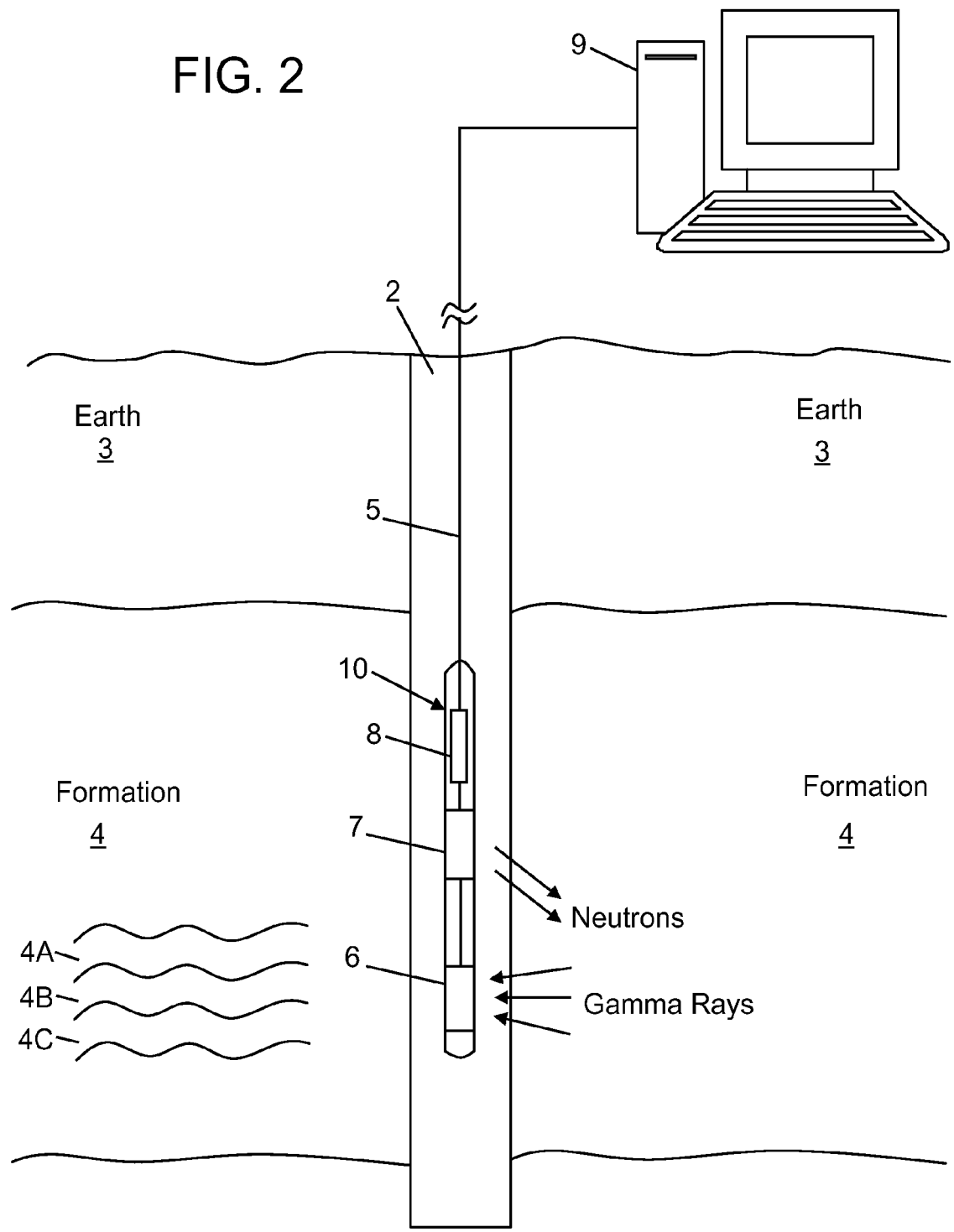

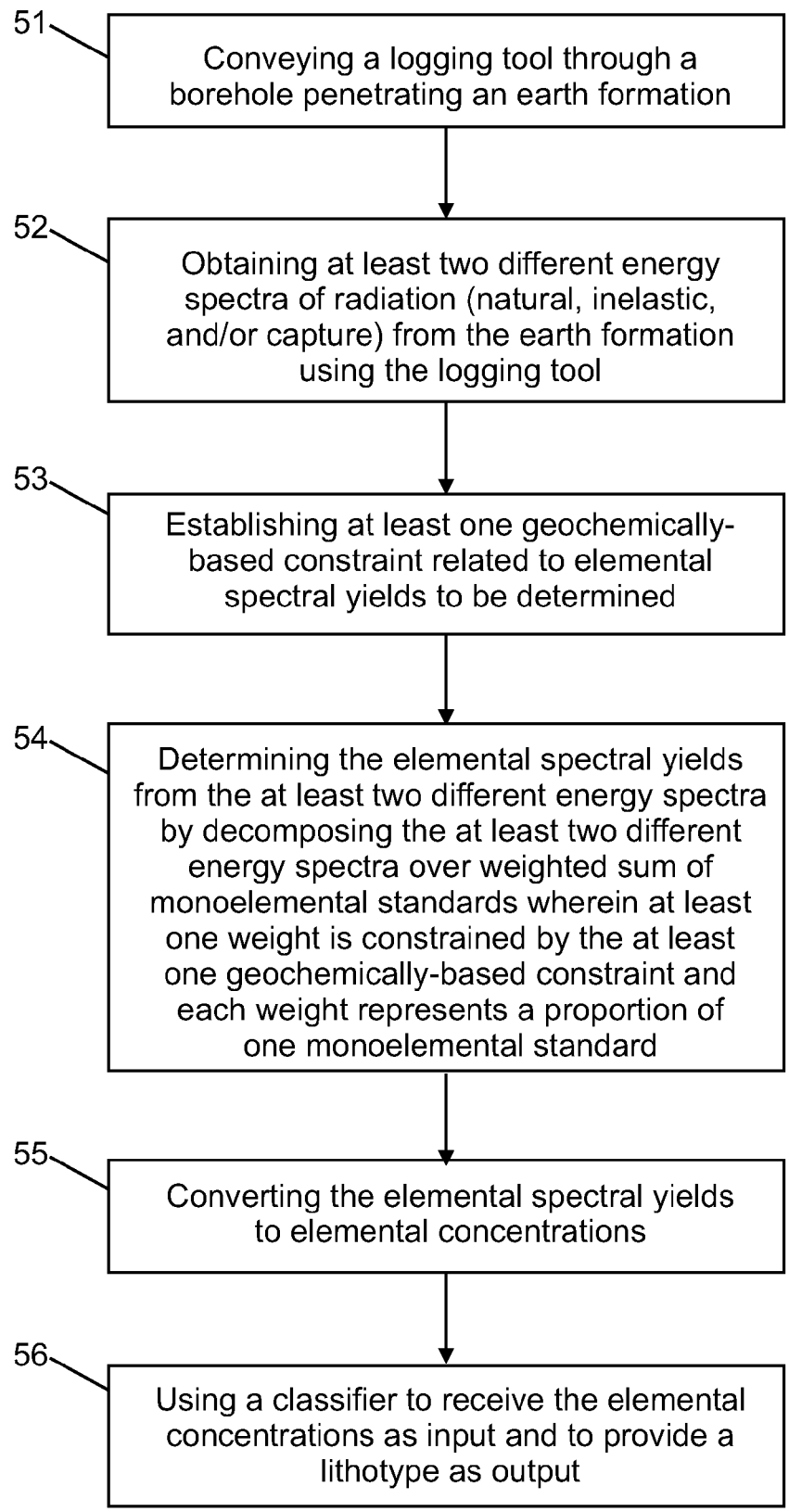

USE OF CHEMICALLY AND GEOLOGICALLY CONSISTENT CONSTRAINTS FOR OBTAINING ELEMENTAL CHEMISTRY DOWNHOLE

CROSS REFERENCE TO RELATED APPLICATIONS

This application claims the benefit of an earlier filing date from U.S. Provisional Application Ser. No. 61/171,583 filed Apr. 22, 2009, the entire disclosure of which is incorporated herein by reference.

BACKGROUND OF THE INVENTION

1. Field of the Invention

The invention disclosed herein relates to estimating elemental concentrations and formation lithology of an earth formation and, in particular, to using a logging tool to provide data used for the estimating.

2. Description of the Related Art

Reservoirs of hydrocarbons are generally contained in rock formations. Many types of lithology may include these reservoirs. Factors such as the size and location of the reservoirs may depend on the type of lithology. For example, a particular type of lithology can indicate characteristics consistent with a hydrocarbon-bearing reservoir. Thus, an accurate knowledge of the type of lithology encountered during exploration or production can provide for an efficient use of exploration and production resources.

Well logging is a technique used to measure formation properties. In well logging, a logging tool is conveyed in a borehole penetrating an earth formation. The logging tool contains an instrument adapted for measuring physical values being proportional to the concentrations of the elements that make up the minerals in a lithology of the earth formation. The instrument, such as a spectrometer, can measure gamma-ray spectra to extract from them yields of various elements with varying degrees of accuracy. Thus, some elemental yields will be measured with more accuracy than other elemental yields. Unfortunately, inaccurate determinations of elemental yields can lead to inaccurate determinations of elemental concentrations and of a type of lithology. Without an accurate determination of the type of lithology, petroanalysts may perform inaccurate assessments of reservoir productivity and hydrocarbon reserves.

Therefore, what are needed are techniques to accurately estimate a particular lithology. Preferably, the techniques can be used with data, such as measurements of spectra, obtained from logging tools.

BRIEF SUMMARY OF THE INVENTION

Disclosed is a method for estimating a lithotype of an earth formation, the method includes: conveying a logging tool through a borehole penetrating the earth formation; obtaining at least two different energy spectra of radiation received from in and/or around the borehole using the logging tool, each energy spectrum having at least one of a natural gamma-ray spectrum, a fast neutron-induced inelastic spectrum, and a thermal neutron induced capture spectrum; establishing at least one geochemically-based constraint related to elemental spectral yields to be determined; determining the elemental spectral yields from the at least two different energy spectra by decomposing the at least two different energy spectra over weighted sum of monoelemental standards wherein at least one weight is constrained by the at least one geochemically-based constraint and each weight represents a proportion of one monoelemental standard; converting the elemental spectral yields to elemental concentrations; and using a classifier to receive the elemental concentrations as input and to provide a lithotype as output.

Also disclosed is an apparatus for estimating a lithotype of an earth formation, the apparatus includes: a logging tool conveyable through a borehole penetrating the earth formation and configured to obtain at least two different energy spectra of radiation received from in and/or around the borehole, each energy spectrum having at least one of a natural gamma-ray spectrum, a fast neutron-induced inelastic spectrum, and a thermal neutron induced capture spectrum; and a processor configured to implement a method including: receiving the at least two different energy spectra; establishing at least one geochemically-based constraint related to elemental spectral yields to be determined for the earth formation; determining the elemental spectral yields from the at least two different energy spectra by decomposing the at least two different energy spectra over weighted sum of monoelemental standards wherein at least one weight is constrained by the at least one geochemically-based constraint and each weight represents a proportion of one monoelemental standard; converting the elemental spectral yields to elemental concentrations; and using a classifier to receive the elemental concentrations as input and to provide a lithotype as output.

Further disclosed is a computer-readable storage medium having stored thereon a program comprising instructions that when executed perform a method for estimating a lithotype of an earth formation penetrated by a borehole, the method includes: obtaining at least two different energy spectra of radiation received from in and/or around the borehole, each energy spectrum having at least one of a natural gamma-ray spectrum, a fast neutron-induced inelastic spectrum, and a thermal neutron induced capture spectrum; establishing at least one geochemically-based constraint related to elemental spectral yields to be determined for the earth formation; determining the elemental spectral yields from the at least two different energy spectra by decomposing the at least two different energy spectra over weighted sum of monoelemental standards wherein at least one weight is constrained by the at least one geochemically-based constraint and each weight represents a proportion of one monoelemental standard; converting the elemental spectral yields to elemental concentrations; and using a classifier to receive the elemental concentrations as input and to provide a lithotype as output.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIGS. 1A and 1B, collectively referred to as FIG. 1, illustrate a schematic overview of techniques for determining a lithotype of an earth formation and concentrations of minerals forming the lithotype;

FIG. 2 illustrates an exemplary embodiment of a logging tool disposed in a borehole penetrating the earth;

FIG. 5 presents one example of a method for estimating the lithotype of the earth formation.

DETAILED DESCRIPTION OF THE INVENTION

Disclosed are embodiments of techniques for accurately determining a type of lithology or "lithotype" encountered during exploration and production of hydrocarbons. The techniques, which include apparatus and method, call for producing at least two energy spectra of natural gamma rays and of gamma rays excited in and/or around a borehole by neutrons born in a neutron generator inside a logging tool where each spectra is produced using a different method. The elements in the minerals are measured in one or more of these spectra with varying degrees of accuracy. Accuracy limitations can result from various causes such as the signal being weak or a lack of linear independence in the elemental standard. When an element in one spectrum is measured with a high degree of accuracy, that information is used to mathematically constrain that same element in another spectrum where the accuracy may be low or limited.

The mathematics involves application of the bounded value weighted least-squares (bvwls) approach where input factors provide constraints, or boundaries, on the resulting elemental yields. In such a manner, the elements with low accuracies are not allowed to affect the accuracy of the other elements. This framework can also be used to apply external geological constraints on the elements. For example, if core data provides no evidence of dolomite, then the magnesium (Mg) element in carbonates can be constrained accordingly.

In order to determine the lithology, a classification algorithm referred to herein as a classifier takes the elemental concentrations as input and provides a type of lithology as output. In general, the classifier identifies minerals that the elemental concentrations represent. Thus, a range of concentration of the minerals may also be used as a constraint by the classifier.

Figure 1A:
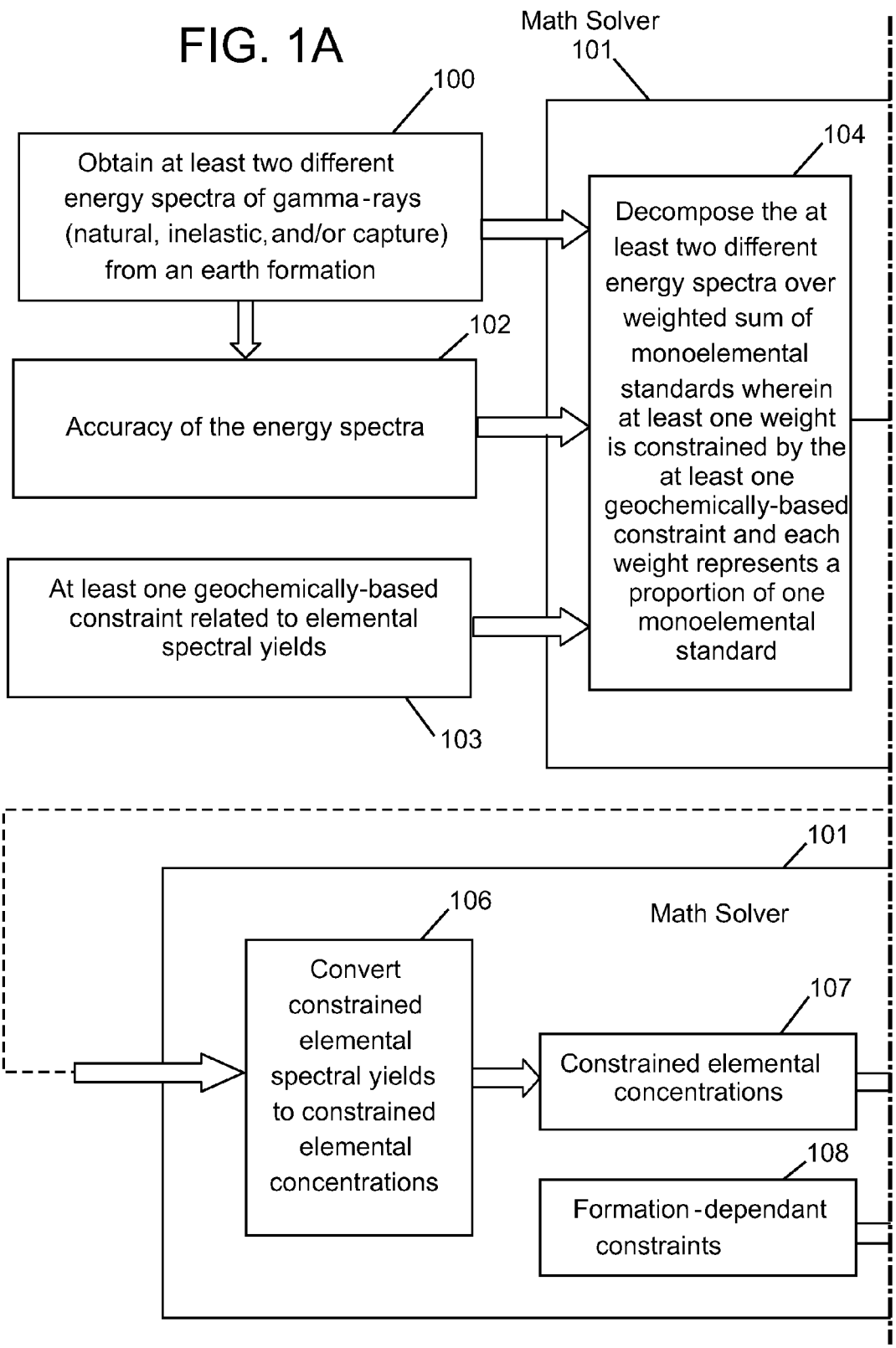

FIG. 1 illustrates a schematic overview of the techniques disclosed herein. Referring to FIG. 1, block 100 represents the at least two energy spectra obtained with at least one logging tool conveyed through a borehole penetrating an earth formation. Block 102 represents accuracy of the at least two energy spectra. Block 103 represents at least one geochemically-based constraint related to spectral yields that are to be determined. Block 101 represents a mathematical solver. The mathematical solver operates on data from blocks 100, 102 and 103. Block 104 represents decomposing the at least two energy spectra within the input constraints to determine the constrained elemental spectral yields of block 105. Block 106 represents converting or transforming the constrained elemental spectral yields to the constrained elemental concentrations of block 107. Block 109 represents a classifier algorithm that receives the elemental concentrations and formation-dependent constraints (block 108) as input and outputs a lithotype (block 110) classifying the earth formation.

Reference may now be had to FIG. 2 for illustrating an exemplary embodiment of a logging tool for measuring elemental yields. The elemental yields are used as input for the teachings disclosed herein. Referring to FIG. 2, a logging tool 10 is shown disposed in a borehole 2 penetrating the earth 3. The borehole 2 may be open or cased. The earth 3 includes a formation 4, which may have layers 4A-4C. The logging tool 10 is conveyed through the borehole 2 by an armored wireline 5 or slickline. In logging-while-drilling (LWD) applications, the logging tool 10 may be disposed at a drill string or coiled tubing and, thus, conveyed through the borehole 2 while the borehole 2 is being drilled.

Referring to FIG. 2, the logging tool 10 includes an electronic unit 8 configured for operating the logging tool 10 or communicating data, which includes measurements performed by the tool 10 to a processing system 9 disposed at the surface of the earth 3. The electronic unit 8 may also be configured to store the data for later retrieval when the logging tool 10 is removed from the borehole 3.

The logging tool 10 in the embodiment shown in FIG. 2 is configured to perform a spectrographic analysis of elements in the formation 4. The measured elements include Al, C, Ca, Cl, Fe, Gd, H, K, Mg, Mn, O, S, Si, Th, Ti and U. The spectrographic analysis may be performed by natural gamma ray spectroscopy or pulsed-neutron gamma ray spectroscopy. As a result of the spectrographic analysis, at least three gamma ray energy spectra can be produced—a natural gamma ray spectra, a fast neutron-induced inelastic spectra, and a thermal neutron-induced capture spectra. Various elements may contribute to different extents to the spectra that are to be measured in one or more of these three spectrographic analysis techniques with varying degrees of accuracy.

Referring to FIG. 2, the logging tool 10 includes a gamma ray detector 6. A gamma ray detector 20 is configured to detect and measure gamma rays, which can be naturally occurring gamma rays, gamma rays produced by fast-neutron induced inelastic collisions, or gamma rays produced by thermal neutron induced capture. The logging tool 10 also includes a neutron source 21 configured to emit neutrons for the fast-neutron inelastic collisions or for the thermal neutron induced capture. In one embodiment, the neutron source 21 is a pulsed-neutron source.

For the purposes of this discussion, it is assumed that the borehole 2 is vertical and that the formation 4 is horizontal. The teachings herein, however, can be applied equally well in deviated or horizontal wells or with the formation layers 4A-4C at any arbitrary angle. The teachings are equally suited for use in LWD applications and in open-borehole and cased-borehole applications. When used in LWD applications, drilling may be halted temporarily to prevent vibrations while the logging tool 10 is performing a measurement.

At least two gamma-ray spectra are measured. In processing of a measured γ-spectrum, N mono-element standard spectra are used. Each spectrum corresponds to a certain chemical element forming the rock (i.e., the formation 4). Each standard spectrum is a column—a set of numbers corresponding to detector data collected in L energy channels. Let $\overline{S}_j$ (j=1, . . . , N are the indices of the elements) be the standard columns and $\overline{c}$ be the measured column of the "counts". All the columns–$\overline{S}_j$ (j=1, . . . , N) and $\overline{c}$ are considered normalized to unity. In this method, the formation spectrum $\overline{c}$ is approximated with a linear combination of various mono-element spectra:

$$\overline{c} \cong \sum_{j=1}^{N} S_j \cdot Y_j \equiv S\overline{Y} \tag{1}$$

where $Y_j$ are unknown "yields" for each element, $\overline{Y} = (Y_1, \ldots, Y_N)^T$ and S is the matrix composed from the columns of mono-elemental standards $\overline{S}_j$, j=1, . . . , N.

Once at least two spectra are measured, each elemental yield can be identified as being accurate (at or above a selected level of accuracy) or inaccurate (at or below a selected level of accuracy). Non-limiting criteria to determining accuracy include signal strength, relative number of counts, and a lack linear independence in the elemental standard. Elemental yields identified as accurate are constrained in the data processing of the obtained spectra. Thus, elemental yields identified as being inaccurate are not allowed to affect the accurate elemental yields in the data processing.

Equation (1) may be regarded as approximation to an "idealized" problem, in which theoretical expression for an arbitrary count is represented as a sum of contributions from different elements according to the Superposition principle. Within the problem, a rigorous explicit definition of the yields is given and their property is derived to be non-negative. This property is extended to the real problem:

$$Y_j \geq 0, j=1, \ldots, N. \quad (2)$$

The real problem tends to the idealized one as the monoelement standards tend to idealized ones.

Some standards are very similar to each other. Hence, the matrix S is ill-conditioned and may result in negative values of the yields. Therefore, a solution to equation (1) under constraints equation (2) is sought after. In one embodiment, a constrained minimum of the quadratic function of the column $\overline{Y}$ is determined as $$\min_{\overline{Y} \geq 0} \langle S\overline{Y} - \overline{c}, W(S\overline{Y} - \overline{c}) \rangle \quad (3)$$

where W is a given weight diagonal (L×L)-matrix. The problem of equation (3) with constraints (2) has a unique solution. In one embodiment, the weight diagonal W is determined from the accuracy or accuracy limitations related measuring the elements in the minerals in the formation 4.

The system of constraints (2) can be extended by using a priori information—if there is any—on linear combinations of the sought elemental yields. This information can be useful in solving ill-posed problem like the problem of equation (3) with constraints (2).

A constrained minimum can also be represented as minimizing $$\langle S\overline{Y} - \overline{c}, W(S\overline{Y} - \overline{c}) \rangle \quad (4)$$

for elemental yields $Y_i$ within some "box-constraints" on yields $[Y_i^{min}; Y_i^{max}]$ where i represents an element number from 1 to N; $\overline{c}$ represents measured spectrum (natural radioactivity, capture radioactivity or inelastic radioactivity); $\overline{S}_i$ represents the monoelemental standard spectra; W is equal to unit matrix, and the extended system of constraints (2) is used. The constraints $[Y_i^{min}; Y_i^{max}]$ are derived from the natural limitations on elemental concentrations (or Weight Fractions, $[WF_i^{min}; WF_i^{max}]$) in formations.

This approach can also be applied to interpretation of arbitrary gamma ray energy spectra.

The number of the standards $S_j$ is much less than their dimension. The approximation can be improved by addition of other standard spectra to the set of standards keeping the linear independence of the set. For example, hydrogen is present both in the borehole 2 and in the formation 4 with different concentrations. Using numerical modeling, the hydrogen standard spectrum can be decomposed into a sum of borehole and formation contributions. Items of the sum can be used as the new standards instead of old standards. The term "decompose" relates to dividing an energy spectrum into components where each component can be attributed to a source of that component. The same decomposition can be realized for chlorine standard spectrum or for potassium spectrum of natural radioactivity.

Figure 3:
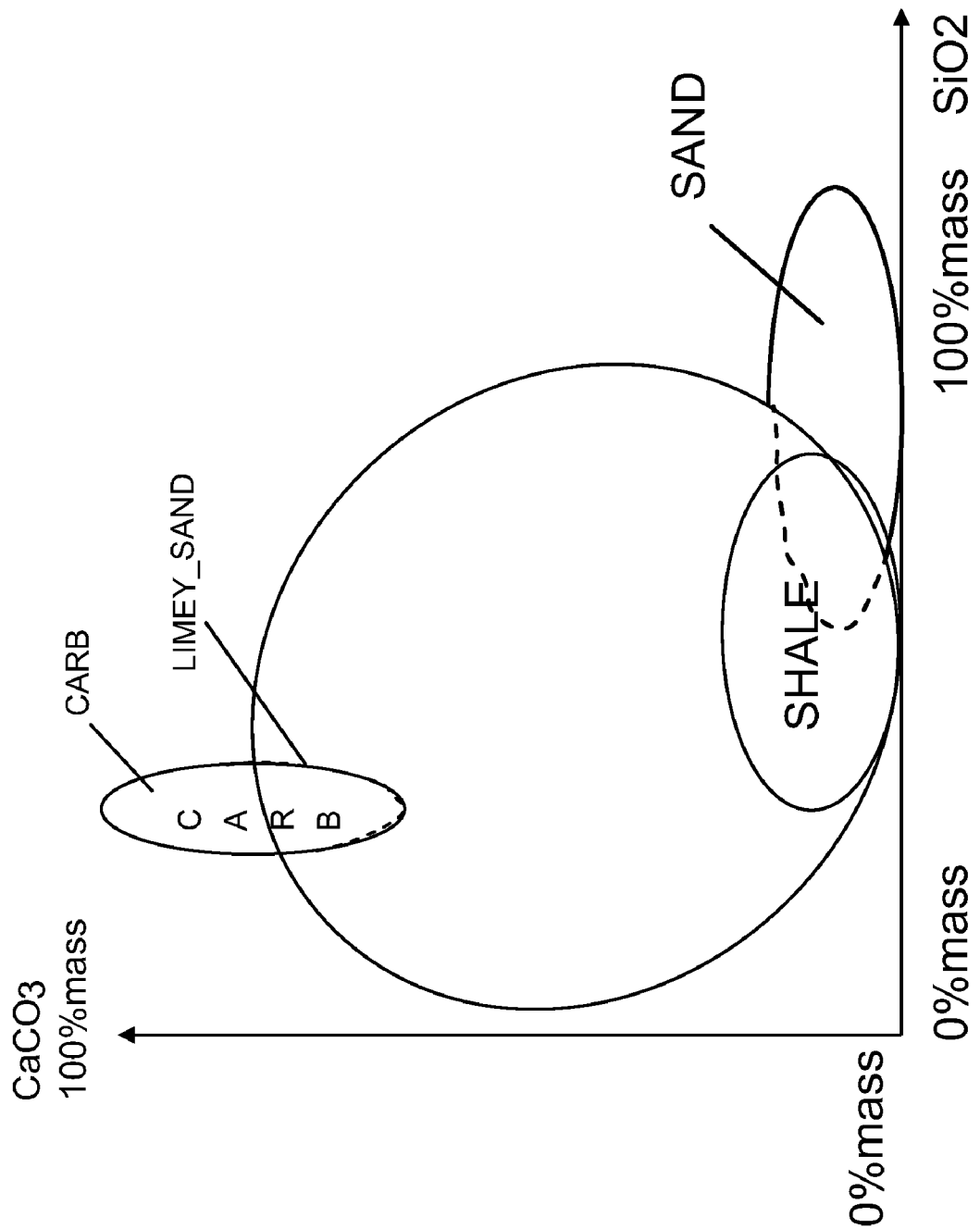
FIG. 3 illustrates a schematic view of overlapping of different lithologies in calcite and quartz content.

Next, a classifier is presented allowing conversion of elemental chemistry of rocks into lithotypes, and then into minerals' ensembles. A first classifier (listed in Table 1) determines "General lithology," for which a given elemental input corresponds. This approach is very robust, because it allows distinguishing inputs uniquely between different "General lithology" types, which overlap in both chemical and mineralogical compositions as shown in FIG. 3. The classification rules in the first classifier are based on triggering of elemental compositions and ratios of the elemental compositions.

Unfortunately, the upper and lower limits for minerals' concentrations (or proportions) in each lithotype cannot be extracted directly from the classification rules noted above. However, the limits are necessary for the alternative approach of determination of minerals using n-γ spectra measurements. This approach employs recurring improvement in accuracy of γ-spectra-to-concentrations conversion using minerals proportions obtained at a previous iteration. The determination of the upper and lower limits is presented further below.

According to the rules of the "General lithology" expert system, used in the first classifier, the formation 4 can be divided into six "gross-lithology" classes (or lithotypes). These lithotypes are listed below in the first column of Table 1. A second classifier (also listed in Table 1) is presented that operates with different lithotypes. The later lithotypes are given in the second column of Table 1. Arrows are used to cross-correlate lithotypes from the first classifier with those from the second classifier. In Table 1, Roman numerals show order of lithotype in the first classifier sequence. One significant change in the lithotypes presented in the second classifier is the removal of LIME_SAND lithology (removed at the expense of re-distribution of its mineralogical assemblages into SAND and CARBONATE_L). Another difference of the first classifier and the second classifier is the addition of COAL lithotype. Coal is not present in formations everywhere, and when it is present, it is relatively easy to determine, (as "much carbon, few all other elements").

TABLE 1

| First Classifier | Second Classifier |
| --- | --- |
| I) SAND → | V) SAND |
| II) LIMEY_SAND → V, III | |
| III) SHALE → | VI) SHALE |
| IV) DOLOSTONE → | I) CARBONATE_D (CARB_DOLO) |
| V) ANHYDRITE (EVAPORITE)* → | II) ANHYDRITE (EVAPORITE)* |
| VI) CARBONATE → | III) CARBONATE_L (CARB_LIME) |
| | IV) COAL |
| Both classifiers have such a rules that some minerals' assemblages fall into no lithotype: these cases are referred to as 'RESIDUAL_LITHOLOGY': | |
| VII) RESIDUAL_LITHOLOGY → | VII) RESIDUAL_LITHOLOGY |

*(The term "EVAPORITE" is used instead of "ANHYDRITE" in order not to confuse it with the same-named mineral).

Two types of weight-fraction (WF) constraints are considered. The first type of WF constraint is the most general and "widest," being rock-independent (i.e., involving most general information about chemistry of sedimentary rocks). The second type of WF constraint is formation dependent and is associated with a concept where some lithotype is attributed to a sedimentary rock.

With respect to the first type of WF constraint, "pure monomineral rocks" are considered, each containing only one mineral, having the greatest WF of a given element among all other minerals. Minerals considered are given as a list in Table 2. The listed minerals are considered to represent the lithotypes listed under the second variant in Table 1 and to represent basic composition of sedimentary rocks presented. Only two clay minerals (with somewhat conditional chemical formulas) are chosen to represent chemistry of "Mg-clays" and "Fe-clays," which are used in the second classifier. Coal is not included because, as discussed above, coal is relatively easy to determine when it is present.

TABLE 2

| | | |
|---|---|---|
| 1. | Quartz | $SiO_2$ |
| 2. | Calcite | $CaCO_3$ |
| 3. | Anhydrite | $CaSO_4$ |
| 4. | Dolomite | $CaMg(CO_3)_2$ |
| 5. | NaFS (ALBITE) | $NaAlSi_3O_8$ |
| 6. | KFS (ORTOCLASE) | $KAlSi_3O_8$ |
| 7. | CaFS (ANORTITE) | $CaAl_2Si_2O_8$ |
| 8. | Mg_glauconite (as Mg-clay) | $KMg_3AlSi_3O_{10}(OH)_2$ |
| 9. | Fe_chlorite (as Fe-clay) | $Fe_4AlSi_3O_{10}(OH)_8$ |
| 10. | Pyrite | $FeS2$ |

For each "pure monomineral rock," maximal values of the concentrations of the elements (based on the minerals' stoichiometry) were computed. Absolute maximal $WF_i^{max}$ of the elements in formations were found as maximal values among all the minerals. Absolute minimal concentrations $WF_i^{min}$ were set to zero. The limits derived in such a way are given in Table 3. Table 3 presents limits for the concentrations of elements in non-classified rock (i.e. before attributing some lithotype to it). Upper limits are determined as maximal concentration of element among variants of "pure monomineral rocks" (containing only one mineral of all the considered minerals).

TABLE 3

| | $[WF_i^{min} - WF_i^{max}]$ |
|---|---|
| Si | 0.00-0.47 |
| Al | 0.00-0.19 |
| O | 0.00-0.53 |
| Na | 0.00-0.39* |
| K | 0.00-0.52** |
| Ca | 0.00-0.40 |
| Mg | 0.00-0.29*** |
| C | 0.00-0.13 |
| Fe | 0.00-0.47 |
| S | 0.00-0.53 |

*for clean NaCl
**for clean KCl
***for clean $MgCO3$

Next, the second type of WF constraint is discussed. The second type of WF constraint is derived from the more "condensed" types of rocks, for which division of formations into lithotypes is considered. The second classifier, presented above in Table 1, provides for converting elemental chemistry of rocks into lithotypes, and then into mineral ensembles. As a first step in the classification, the second classifier determines "general lithology, for which a given elemental input corresponds. This approach allows distinguishing inputs uniquely between different general lithology types, which overlap in both chemical and mineralogical compositions. The rules (or expert system) for determining the lithotypes in the second classifier are presented as an exemplary schematic diagram in FIG. 4.

The second classifier receives concentrations of elements Si, K, Ca, Mg, Fe, S and C as input, and compares the combinations of the elements to threshold values to guide the inputs into one of the lithotypes listed in the second classifier. Such a "triggering"guides the combination of elements into one of the lithotypes listed in the first classifier.

Figure 4:
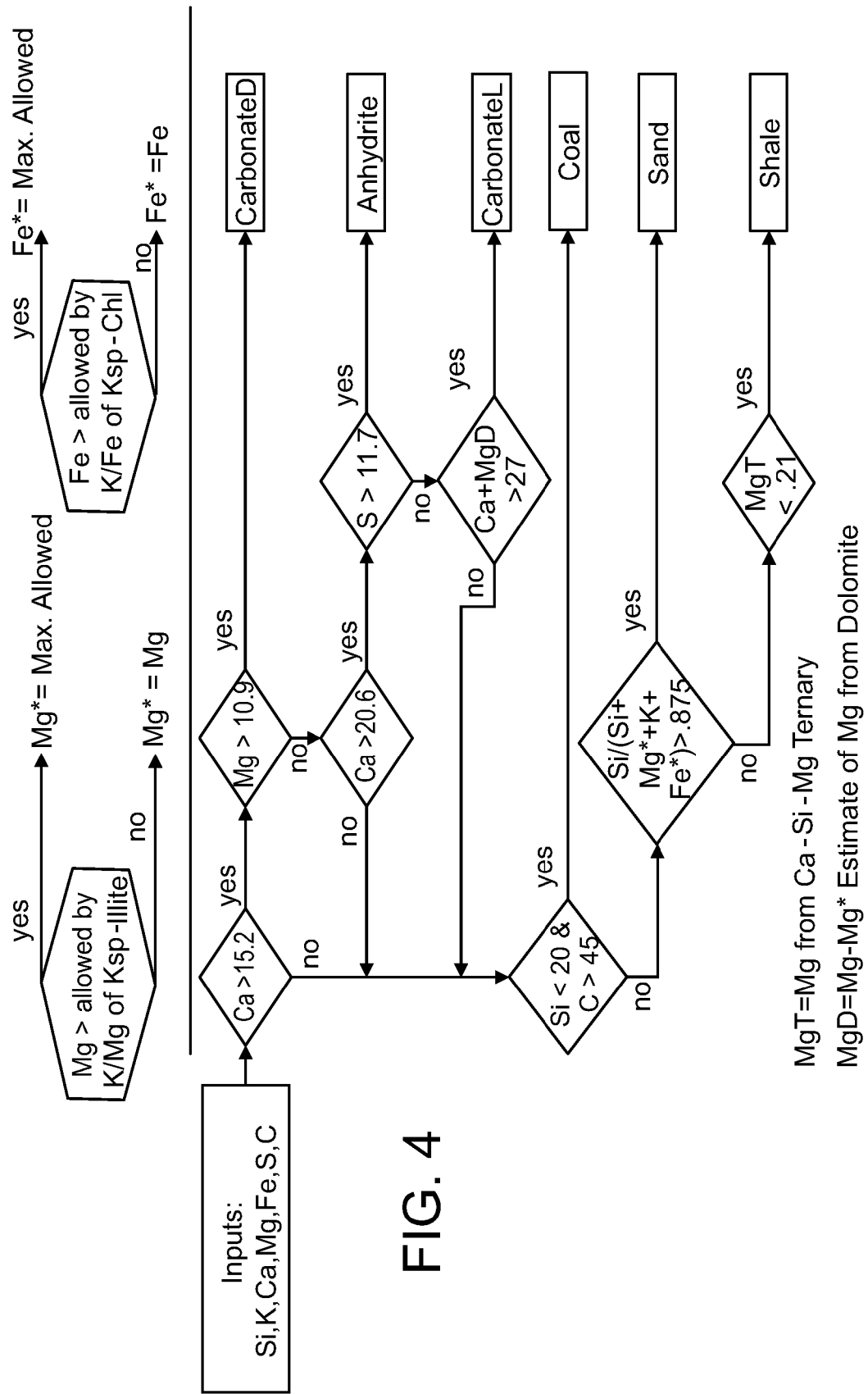
FIG. 4 illustrates an exemplary schematic diagram of a classifier configured for classifying elemental concentrations into a lithotype.

The rules presented in FIG. 4 are not sufficient alone to derive the upper and lower limits for minerals' concentrations (proportions) in each lithotype directly. Therefore, numerical testing was used by supplying all possible mineral ensembles as input to the second classifier. The set of minerals from Table 2 was used to quantify mineralogical and elemental constraints. All other ignored minerals (like siderite or kaolinite) have collinear chemistry and approximately similar genesis in comparison to some of the minerals presented in Table 2.

From the numerical testing, probability distributions of concentrations of minerals listed in Table 2 for each lithotype listed under the second classifier in Table 1 were determined. From the probability distributions and an evaluation of data on mineralogy of sedimentary rocks of various lithotypes, upper and lower limits for concentrations of minerals in each of the various lithotypes were selected.

The first selection of the upper and lower limits from the numerical testing of the classifiers appeared to be too wide, much wider than the first type WF-constraints obtained from "basic principles" and shown in Table 3. (The "wide constraints" just reflect a property of this classification tool, and do not underestimate the ability of the tool to classify rocks. This property particularly results from the fact that the classifiers operate not only with elemental concentrations but also with elemental ratios.) An improvement is to narrow the ranges for the minerals in each lithotype. One of the keys to narrowing is the magnitude of probability for a mineral to occur in a lithotype: when this probability is low, the upper limit for mineral concentration may be decreased significantly. Another way to obtain more robust estimates of the upper and lower limits is to evaluate extensive data on mineralogy of sedimentary rocks from the point of view of the chosen lithotypes division. Published data was evaluated on most common patterns of mineralogical compositions of different sedimentary rocks. New empirical estimates of upper and lower limits of minerals in each lithotype were obtained from the evaluation. The new empirical estimates are presented in Table 4.

TABLE 4

| | SAND | SHALE | CARB DOLO | EVAP- ORITE | CARB LIME |
|---|---|---|---|---|---|
| Quartz | [0.39; | [0.30; | [0.00; | [0.00; | [0.00; |
| $SiO_2$ | 1.00] | 0.62] | 0.15] | 0.15] | 0.15] |
| Calcite | [0.00; | [0.00; | [0.00; | [0.00; | [0.52; |
| $CaCO_3$ | 0.43] | 0.30] | 0.55] | 0.50] | 1.00] |
| Anhydrite | [0.00; | [0.00; | [0.00; | [0.50; | [0.00; |
| $CaSO_4$ | 0.15] | 0.30] | 0.40] | 1.00] | 0.30] |
| Dolomite | [0.00; | [0.00; | [0.40; | [0.00; | [0.00; |
| $CaMg(CO_3)_2$ | 0.15] | 0.30] | 1.00] | 0.40] | 0.30] |
| Albite NaFS | [0.00; | [0.00; | [0.00; | [0.00; | [0.00; |
| $NaAlSi_3O_8$ | 0.30] | 0.30] | 0.10] | 0.10] | 0.10] |
| Ortoclase KFS | [0.00; | [0.00; | [0.00; | [0.00; | [0.00; |
| $KAlSi_3O_8$ | 0.30] | 0.30] | 0.10] | 0.10] | 0.10] |
| Anortite CaFS | [0.00; | [0.00; | [0.00; | [0.00; | [0.00; |
| $CaAl_2Si_2O_8$ | 0.30] | 0.30] | 0.10] | 0.10] | 0.10] |
| Mg-glauconite | [0.00; | [0.00; | [0.00; | [0.00; | [0.00; |
| $KMg_3AlSi_3O_{10}(OH)_2$ | 0.30] | 1.00]* | 0.48] | 0.30] | 0.48] |
| Fe-chlorite | [0.00; | [0.00; | [0.00; | [0.00; | [0.00; |
| $Fe_4AlSi_3O_{10}(OH)_8$ | 0.30] | 1.00]* | 0.48] | 0.30] | 0.48] |
| Pyrite | [0.00; | [0.00; | [0.00; | [0.00; | [0.00; |
| $FeS_2$ | 0.15] | 0.30] | 0.25] | 0.50] | 0.30] |

*additional condition: sum of Mg-glauconite and Fe-chlorite belongs to [0.38; 1.00].

The upper and lower limits of minerals' concentrations (i.e., fractions in each lithotype) can be converted into limits for weight fractions of chemical elements using the minerals' stoichiometry. An upper limit $WF_i^{max}$ can be estimated as the sum of limits for the element over all minerals, whereas a lower limit $WF_i^{min}$ can be estimated as minimal concentration of the elements over all minerals. The "lithotype-dependent-" elemental limits after stoichiometrical inversion of the data from Table 4 are presented in Table 5.

TABLE 5

|    | SAND      | SHALE     | CARB DOLO | EVAPORITE | CARB LIME |
|----|-----------|-----------|-----------|-----------|-----------|
| Si | 0.18-0.47 | 0.25-0.47 | 0.00-0.31 | 0.00-0.25 | 0.00-0.31 |
| Al | 0.00-0.15 | 0.04-0.19 | 0.00-0.09 | 0.00-0.07 | 0.00-0.09 |
| O  | 0.21-0.53 | 0.48-0.53 | 0.21-0.53 | 0.24-0.53 | 0.25-0.53 |
| Na | 0.00-0.03 | 0.00-0.03 | 0.00-0.01 | 0.00-0.39 | 0.00-0.01 |
| K  | 0.00-0.07 | 0.04-0.14 | 0.00-0.06 | 0.00-0.04 | 0.00-0.06 |
| Ca | 0.00-0.29 | 0.00-0.32 | 0.09-0.40 | 0.15-0.40 | 0.21-0.40 |
| Mg | 0.00-0.10 | 0.00-0.26 | 0.05-0.29 | 0.00-0.17 | 0.00-0.17 |
| C  | 0.00-0.07 | 0.00-0.08 | 0.05-0.13 | 0.00-0.11 | 0.06-0.13 |
| Fe | 0.00-0.18 | 0.00-0.47 | 0.00-0.36 | 0.00-0.34 | 0.00-0.31 |
| S  | 0.00-0.08 | 0.00-0.16 | 0.00-0.21 | 0.00-0.27 | 0.00-0.16 |

FIG. 5 presents one example of a method 50 for estimating a lithotype in the earth formation 4 penetrated by the borehole 2. The method 50 calls for (step 51) conveying the logging tool 10 through the borehole 2. Further, the method 50 calls for (step 52) obtaining at least two different energy spectra from the formation 4 of natural gamma-rays and of gamma-rays excited in and/or around the borehole 2 by neutrons born in a neutron generator inside the logging tool 10, the tool 10 being used to obtain the two energy spectra. For example, one energy spectrum can be of natural gamma-rays while the other spectrum can be of neutron-induced gamma-rays (such as from inelastic scattering and/or thermal neutron capture. Further, the method 50 calls for (step 53) establishing at least one geochemically-based constraint such as derived from Table 5. The at least one constraint can also include an accuracy of each of the at least two different energy spectra. Further, the method 50 calls for (step 54) determining elemental spectral yields within yields-constraints derived from weight-fraction constraints such as those in Table 3 by constrained decomposition of each of the measured energy spectra over monoelemental standards. Alternatively, step 54 may be described as determining the elemental spectral yields from the at least two different energy spectra by decomposing the at least two different energy spectra over a weighted sum of monoelemental standards wherein at least one weight in the weighted sum is constrained by the at least one geochemically-based constraint. In one embodiment, each weight in the weighted sum may be regarded as a coefficient that represents a proportion of one monoelemental standard within the weighted sum of monoelemental standards. Thus, each weight in one embodiment is greater than or equal to zero and less than or equal to one where the sum of all the weights equals one. Further, the method 50 calls for (step 55) converting the elemental spectral yields into elemental concentrations. The elemental concentrations are constrained because the elemental spectral yields are constrained. Further, the method 50 calls for (step 56) using a classifier to receive the elemental concentrations as input and provide a lithology of the earth formation 4 and/or concentrations of minerals in the lithology as output. In one embodiment, the system of method 50 can include a set of equations. Thus, determining elemental spectral yields, converting the elemental spectral yields to elemental concentrations, and classifying the elemental concentrations into a lithology, all within input constraints, can include solving the set of equations using mathematical techniques known in the art such as at least one of linear programming, non-linear programming, integer programming, and mixed-integer programming. In one embodiment, the set of equations can be configured as an optimizing problem where the problem is to determine a constrained minimum such as the constrained minimum represented by function (3) or (4).

The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom hole assemblies (BHA's), drill string inserts, modules, internal housings and substrate portions thereof.

In support of the teachings herein, various analysis components may be used, including a digital and/or an analog system. For example, the electronic unit 8 or the processing unit 9 can include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, voltage supply, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a lithotype of an earth formation, the method comprising:
   conveying a logging tool through a borehole penetrating the earth formation;
   obtaining at least two different energy spectra of radiation received from in and/or around the borehole using the logging tool, each energy spectrum comprising at least one of a natural gamma-ray spectrum, a fast neutron-induced inelastic spectrum, and a thermal neutron induced capture spectrum;
   establishing at least one geochemically-based constraint related to elemental spectral yields to be determined;
   determining the elemental spectral yields from the at least two different energy spectra by decomposing the at least two different energy spectra over weighted sum of monoelemental standards wherein at least one weight is constrained by the at least one geochemically-based constraint and each weight represents a proportion of one monoelemental standard;
   converting the elemental spectral yields to elemental concentrations; and
   using a classifier to receive the elemental concentrations as input and to provide a lithotype as output.

2. The method of claim 1, further comprising irradiating the earth formation with neutrons that are born within a neutron generator disposed in the logging tool.

3. The method of claim 1, wherein the lithotype is selected from a group consisting of sand, coal, shale, carbonate dolostone, evaporate, and carbonate lime.

4. The method of claim 1, wherein the at least one constraint is selected from a group consisting of an accuracy of at least one elemental yield and a range of concentrations of a mineral in the lithotype.

5. The method of claim 4, wherein the accuracy is determined to be a high accuracy at or above a selected level of accuracy.

6. The method of claim 5, wherein the high accuracy of at least one elemental yield in one spectrum is used to constrain that one elemental yield in the other spectrum.

7. The method of claim 6, wherein the high accuracy is determined by at least one of:
   a signal strength related to the at least one elemental yield exceeding a threshold; and
   linear independence from other elements in a standard.

8. The method of claim 4, wherein the accuracy is determined to be a low accuracy at or below a selected level of accuracy.

9. The method of claim 8, wherein the low accuracy of at least one elemental yield in one spectrum is not used to constrain the one elemental yield in the other spectrum.

10. The method of claim 8, wherein the low accuracy is determined by at least one of:
    a signal strength related to the at least one elemental yield not exceeding a threshold; and
    a lack of linear independence from other elements in a standard.

11. The method of claim 4, wherein the range of concentrations comprises at least one of a lower limit and an upper limit.

12. The method of claim 11, wherein the at least one of a lower limit and an upper limit is input as a weight fraction.

13. The method of claim 1, wherein the determining comprises determining a constrained minimum of a quadratic function of column $\overline{Y}$ expressed as:

$$\min_{\overline{Y}\geq 0}\langle S\overline{Y}-\overline{c},W(S\overline{Y}-\overline{c})\rangle \text{ for } Y_j \geq 0, \quad j=1,\ldots,N$$

where:

$$\overline{c} \cong \sum_{j=1}^{N} S_j \cdot Y_j \equiv S\overline{Y};$$

$Y_j$ represents unknown "yields" for each element, $\overline{Y}=(Y_1,\ldots,Y_n)^T$;
N represents a number of the spectra;
$S_j (j=1,\ldots,N)$ represents columns of spectra, each column representing a set of numbers corresponding to detector data collected in L energy channels; and
$\overline{c}$ represents counts.

14. The method of claim 1, wherein the determining comprises determining elemental spectral yields $Y_i$ by minimizing a function expressed as:

$$\left(\overline{C} - \sum_{i=1}^{N} Y_i \cdot \overline{S}_i\right)^2$$

within constraints on the yields expressed as $[Y_i^{min}; Y_i^{max}]$
where i represents a number of an element from 1 to N; $\overline{C}$ represents a measured capture spectrum vector; and $\overline{S}_i$ represents monoelemental standard spectra.

15. The method of claim 14, wherein the constraints for the following elements are provided as a range of weight fractions for lithotypes comprising sand, shale, carbonate dolostone, evaporate, and carbonate lime in that order:
   Si: 0.18-0.47; 0.25-0.47; 0.00-0.31; 0.00-0.25; 0.00-0.31;
   Al: 0.00-0.15; 0.04-0.19; 0.00-0.09; 0.00-0.07; 0.00-0.09;
   O: 0.21-0.53; 0.48-0.53; 0.21-0.53; 0.24-0.53; 0.25-0.53;
   Na: 0.00-0.03; 0.00-0.03; 0.00-0.01; 0.00-0.39; 0.00-0.01;
   K: 0.00-0.07; 0.04-0.14; 0.00-0.06; 0.00-0.04; 0.00-0.06;
   Ca: 0.00-0.29; 0.00-0.32; 0.09-0.40; 0.15-0.40; 0.21-0.40;
   Mg: 0.00-0.10; 0.00-0.26; 0.05-0.29; 0.00-0.17; 0.00-0.17;
   C: 0.00-0.07; 0.00-0.08; 0.05-0.13; 0.00-0.11; 0.06-0.13;
   Fe: 0.00-0.18; 0.00-0.47; 0.00-0.36; 0.00-0.34; 0.00-0.31; and
   S: 0.00-0.08; 0.00-0.16; 0.00-0.21; 0.00-0.27; 0.00-0.16.

16. An apparatus for estimating a lithotype of an earth formation, the apparatus comprising:
   a logging tool conveyable through a borehole penetrating the earth formation and configured to obtain at least two different energy spectra of radiation received from in and/or around the borehole, each energy spectrum comprising at least one of a natural gamma-ray spectrum, a fast neutron-induced inelastic spectrum, and a thermal neutron induced capture spectrum; and
   a processor configured to implement a method comprising:
   receiving the at least two different energy spectra;

establishing at least one geochemically-based constraint related to elemental spectral yields to be determined for the earth formation;

determining the elemental spectral yields from the at least two different energy spectra by decomposing the at least two different energy spectra over weighted sum of monoelemental standards wherein at least one weight is constrained by the at least one geochemically-based constraint and each weight represents a proportion of one monoelemental standard;

converting the elemental spectral yields to elemental concentrations; and using a classifier to receive the elemental concentrations as input and to provide a lithotype as output.

17. The apparatus of claim 16, wherein the logging tool comprises a gamma-ray detector configured to detect gamma rays from the earth formation, the gamma-rays comprising at least one of natural gamma-rays, gamma-rays from inelastic scattering of neutrons, and gamma-rays from thermal capture of neutrons.

18. The apparatus of claim 16, wherein the logging tool comprises a neutron source configured to irradiate the earth formation with neutrons to produce gamma-rays from inelastic scattering of the neutrons and/or gamma-rays from thermal neutron capture of the neutrons.

19. The apparatus of claim 16, wherein the logging tool is configured to be conveyed by a carrier comprising at least one selection from a group consisting of a wireline, a slickline, coiled tubing, a drill string.

20. A non-transitory computer-readable storage medium having stored thereon a program comprising instructions that when executed perform a method for estimating a lithotype of an earth formation penetrated by a borehole, the method comprising:

obtaining at least two different energy spectra of radiation received from in and/or around the borehole, each energy spectrum comprising at least one of a natural gamma-ray spectrum, a fast neutron-induced inelastic spectrum, and a thermal neutron induced capture spectrum;

establishing at least one geochemically-based constraint related to elemental spectral yields to be determined for the earth formation;

determining the elemental spectral yields from the at least two different energy spectra by decomposing the at least two different energy spectra over weighted sum of monoelemental standards wherein at least one weight is constrained by the at least one geochemically-based constraint and each weight represents a proportion of one monoelemental standard;

converting the elemental spectral yields to elemental concentrations; and using a classifier to receive the elemental concentrations as input and to provide a lithotype as output.

* * * * *